United States Patent [19]
Wersinger

[11] 3,981,165
[45] Sept. 21, 1976

[54] OUTBOARD MOTOR PROPELLER LOCK SYSTEM

[76] Inventor: Merol O. Wersinger, 600 Martin Road, Waterloo, Iowa 50701

[22] Filed: Mar. 17, 1976

[21] Appl. No.: 667,566

[52] U.S. Cl. .................................... 70/232; 70/178; 416/146 R
[51] Int. Cl.[2] .......................................... F16B 21/00
[58] Field of Search ............. 70/178, 179, 180, 200, 70/203, 212, 229, 230, 231, 232, DIG. 56, DIG. 58; 416/146 R

[56] References Cited

UNITED STATES PATENTS

| | | | |
|---|---|---|---|
| 748,720 | 1/1904 | Glazier | 70/178 |
| 1,329,913 | 2/1920 | McGuire | 70/232 X |
| 1,760,977 | 6/1930 | Duffy | 70/232 |
| 1,829,444 | 10/1931 | Goebel et al. | 70/232 X |
| 2,847,966 | 8/1958 | McIntosh | 416/146 X |
| 3,181,523 | 5/1965 | Casey | 70/232 |
| 3,732,033 | 5/1973 | Macchi | 416/146 X |
| 3,759,076 | 9/1973 | Reese | 70/232 |

FOREIGN PATENTS OR APPLICATIONS

| | | | |
|---|---|---|---|
| 322,171 | 11/1921 | United Kingdom | 70/DIG. 58 |

*Primary Examiner*—Roy D. Frazier
*Assistant Examiner*—Thomas J. Holko
*Attorney, Agent, or Firm*—Zarley, McKee, Thomte, Voorhees & Sease

[57] ABSTRACT

A propeller lock system comprised of an inner fin lock and an outer fin lock, with the outer fin lock adapted to lock to the inner fin lock to prevent removal from its locking position on a propeller housing.

6 Claims, 5 Drawing Figures

OUTBOARD MOTOR PROPELLER LOCK SYSTEM

BACKGROUND OF THE INVENTION

In recent years the use of outboard motors has increased tremendously. Moreover, with the increasing use of outboard motors, the tendency has been for the user to demand larger motors with more power. As larger outboard motors are used, larger propellers must also be utilized. These larger propellers, of course, must be immune to water rusting and are typically made of high grade stainless steel. Such propellers are very expensive and can cost upwards of $100 and up to as much $125 to $150 for large outboard motors. Such propellers, as will be explained in more detail hereinafter, are held onto the propeller shaft of an outboard motor by a single retaining nut which is exposed as depicted in FIG. 1 of the drawings.

In recent years the theft of propellers from outboard motors has increased with the increased cost of the propellers. The propeller is removed very easily by simply unthreading the propeller shaft retaining nut and slipping the propeller and the propeller housing off of the propeller shaft. Accordingly, in the last few years there has been the need for the development of a propeller lock system which will conveniently lock the large expensive propellers of the modern-day outboard motors to the propeller shaft housing in such a manner that the propeller shaft retaining nut cannot be removed.

In addition, there has been a need for such a propeller lock system which will not damage the propeller in the event that the motor is inadvertently started without removing the propeller lock system.

One example of a propeller lock system suitable for outboard motors is Reese, U.S. Pat. No. 3,759,076, patented Sept. 18, 1973. There are, however, numerous deficiencies in the propeller lock system designed by Reese. For example, the propeller lock system designed by Reese is extremely expensive to make in that it necessitates a separate casting of his cylindrical cover. In addition, he employs a rod and hook member which is difficult to make. As a result, the lock system designed by Reese, while it may perform satisfactorily in certain respects, has not received acceptance because of its extreme expense and complicated structure. In addition, the Reese lock system is dependent for its locking capability upon sliding the cast cover forwardly and rearwardly along the hooked rod, thus requiring a necessity for complex variable adjustment to accommodate the different length propeller shafts employed in the industry.

Accordingly, there is a real need for a propeller lock system which will lock the large expensive outboard motors and/or inboard outdrive units, to prevent access to the propeller shaft retaining nut so that the propeller cannot be removed. Moreover, there is a need for such a system which will operate quickly and conveniently and inexpensively and further, which will allow the propeller to be started without damaging the propeller. Finally, there is a need for a system which satisfies all of the above needs with the propeller lock system being simple to manufacture and which can be manufactured at a minimum of cost in order to keep its ultimate price to the consumer down; and finally, which can utilize one basic lock for all outboard motors regardless of the variability in their basic dimensions.

This invention has as its objects the satisfaction of the above-identified needs.

SUMMARY OF THE INVENTION

This invention relates to a propeller lock system which is easy to manufacture and which can be made out of a single arcuate sheet of 14 to 16 guage steel. The propeller lock system is comprised of an inner fin lock adapted for positioning between a propeller shaft housing and a propeller housing and having a top cover portion and a lower gripping edge; and, further comprising an outer fin lock also adapted to be positioned between a propeller shaft housing and a propeller housing with the outer fin lock having a top cover portion and an elongated body portion, with the elongated body portion being of sufficient width to nearly completely fill the annular space between at least two lugs radially extending from the propeller shaft housing to the propeller housing. The inner and outer fin locks are locked together whereby free rotation of the inner fin lock to a position to wherein it can be removed without its inner gripping edge engaging one of the lugs is prevented.

DETAILED DESCRIPTION OF THE INVENTION

Figure 1:
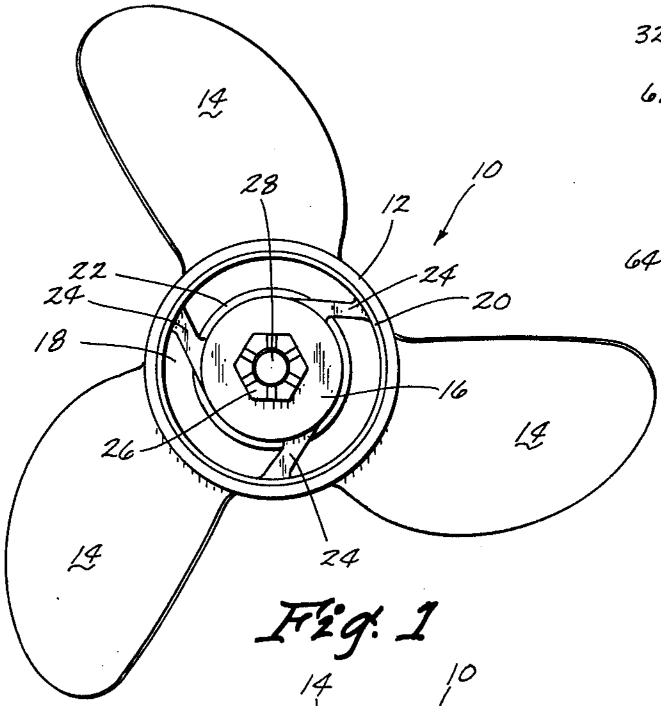
FIG. 1 is a plan view of a propeller and its housing locked to the propeller shaft by a retaining nut.

In order to set the environment for the invention, applicants will first describe the outboard propeller of FIG. 1. The propeller, referred to generally as 10, is comprised of a propeller housing 12 which has a plurality of outwardly radiating propeller fins 14. Spaced apart from and inwardly presented from propeller housing 12 is propeller shaft housing 16 and annular space 18 is defined by the inner wall 20 of propeller housing 12 and the outer wall 22 of propeller shaft housing 16. Propeller shaft housing 16 is supported in concentric relationship with propeller housing 12 by radially outwardly extending lugs 24 which extend between outer wall 22 and inner wall 20. Retaining nut 26 is threadably received on propeller shaft 28 to retain the propeller thereon.

Figure 2:
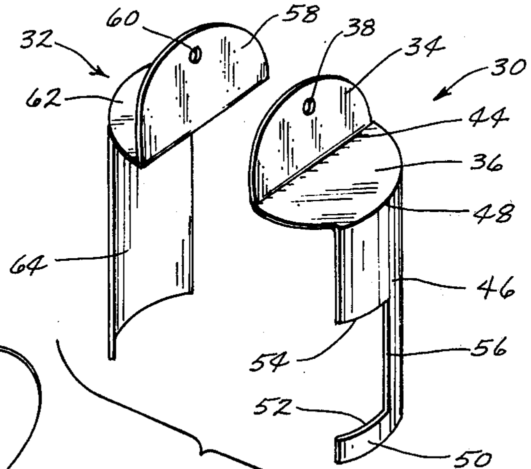
FIG. 2 is a perspective view of the propeller lock system of this invention.
Figure 3:
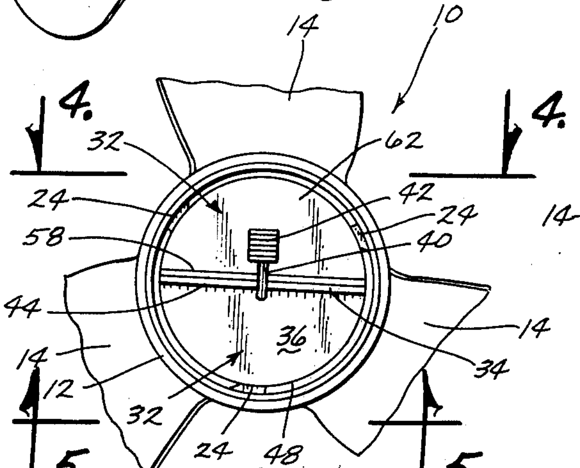
FIG. 3 is a plan view of the propeller, as seen in FIG. 1, with the propeller lock system of FIG. 2 in position.
Figure 4:
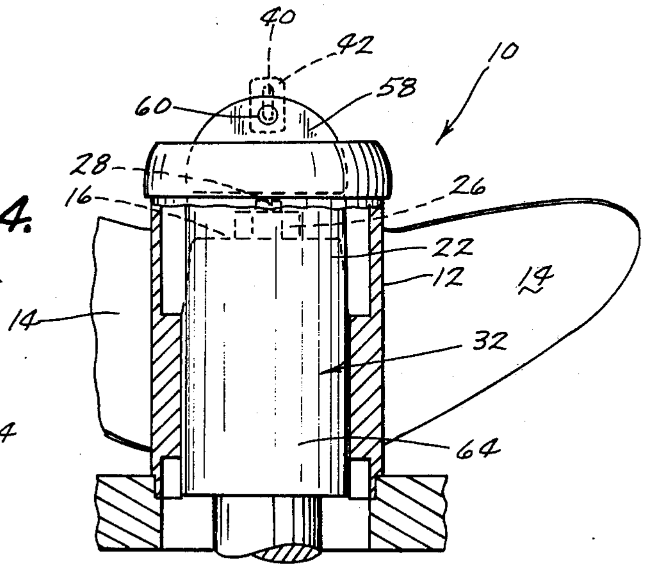
FIG. 4 is a sectional view, with certain parts broken away, along lines 4—4 of FIG. 3.

As seen in FIG. 2, the propeller lock system of this invention is comprised of an inner fin lock referred to generally as 30 and an outer fin lock referred to generally as 32. For purposes of clarity of description, the inner fin lock 30 will first be described in detail before describing outer fin lock 32. Inner fin lock has an upstanding top portion 34 and extending approximately transverse to upstanding top portion 34 is a cover portion 36. Top portion 34 has an aperture 38 for receipt of the hasp 40 of a padlock 42. Upstanding tab 34 and cover portion 36 can both be made from a single circular shaped cutout of number 14 to 16 guage steel by simple bending such a circular cutout along line 44 to provide a right angle bend. Extending downwardly from the outer peripheral edge of top cover portion 36 is an arcuate elongated body member 46. Body member 46 may be welded or riveted or fastened by other conventional means to the outer peripheral edge of cover portion 36 along its top edge designated herein for purposes of description as 48. At the bottom of arcuate elongated body member 46 is a gripping member 50 which has a top gripping edge 52. Gripping member 50 and top gripping edge 52 can be made by simply punching a rectangular cutout in the lower portion of arcuate elongated body member 46 with the cutout defining the shape shown in FIG. 2 defined by inwardly presented edge 54, downwardly presented edge 56 and top gripping 52.

Outer fin lock 32 is comprised of an upstanding top portion 58 having an aperture 60 positioned midway therein, and a cover portion 62 extending approximately transverse to top portion 58. Top portion 58 and cover portion 62 of outer fin lock 32 are of the same dimensions as upstanding top portion 34 and cover portion 36 of inner fin lock 30. Thus the inwardly presented surfaces of top portion 58 and top portion 34 may be matingly received, one against the other with the hasp 40 of padlock 42 through apertures 38 and 60 to lock outer fin lock 32 into engagement with inner fin lock 30.

Extending downwardly from cover portion 62 of outer fin lock 32 is an elongated arcuate body member 64. The width of elongated arcuate body member 64 as measured from one longitudinal edge thereof to the other is such that elongated arcuate body member 64 nearly completely fills the annular space 18 between two lugs 24 thereby preventing any substantial lateral movement of outer fin lock 32 within the annular space defined between two successive lugs 24.

Figure 5:
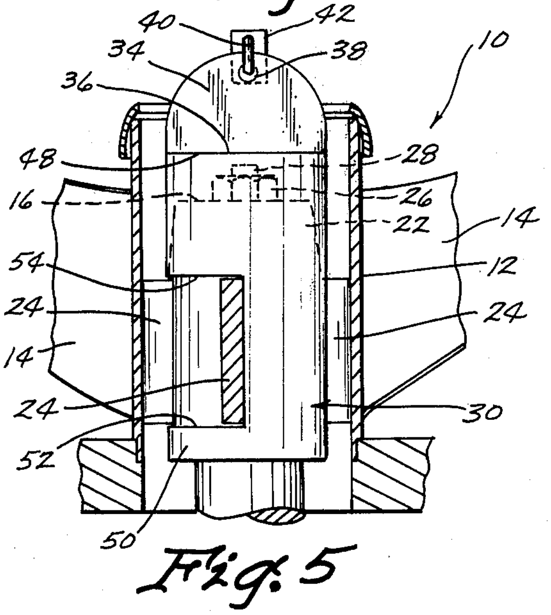
FIG. 5 is a sectional view, with certain parts broken away and other parts appearing in dotted line along line 5—5 of FIG. 3.

In actual operation, the device of the invention works as follows: Inner fin 30 lock is positioned in the annular space 18 between two successive locking lugs 24 and extended downwardly therein. Thereafter inner fin lock 30 is rotated in a clockwise direction to move inner fin lock 30 laterally to the left as viewed in FIG. 1 so that gripping edge 52 engages the bottom surface of one of the lugs 24 as best depicted in FIG. 5. Thereafter, outer fin lock 32 is extended into the oppositely disposed annular space 18 between the two other lugs 24 so that top cover portion 62 and top cover portion 36 are in abutting relationship. Hasp 40 is extended through apertures 38 and 60 and locked to padlock 42. Since elongated arcuate body member 64 is of sufficient width to substantially fill the annular space between two of the locking lugs 24, any significant rotation of outer fin lock 32 is prevented. Correspondingly, since inner fin lock 30 is padlocked to outer fin lock 32, counter clockwise rotation of inner fin lock 30 so that gripping edge 52 can be rotated away from its engagement with the under surface of lug 24, as depicted in FIG. 5, is prevented. Retaining nut 26 is entirely covered and made inaccessible by top cover portions 62 and 36 of outer fin lock 32 and inner fin lock 30.

Thus as can be seen, applicants have provided a simple, economical to manufacture, and compact propeller lock system. The propeller lock system has the initial advantage of the fact that the entire system can be made from a single sheet of 14 to 16 guage steel. For example, the arcuate body members can be conveniently cut therefrom, by stamping or the like, with the entire top comprised of the upstanding top portion and the cover portion 36 made by stamping a circular cutout which is thereafter bent at right angles along line 44 with apertures 38 and 60 thereafter punched. The arcuate body members can then be welded, riveted or the like to the top portions. Thus as can be seen applicant's entire propeller lock system can be formed from four pieces all cut from a single sheet of 14 to 16 guage steel.

The propeller lock may also be locked via a chain or the like to the stern of the boat to help prevent theft of the motor, as well as the propeller.

What is claimed is:

1. A propeller lock system to be used in combination with a boat motor which has a propeller shaft housing and a concentrically positioned spaced apart outer propeller housing with a plurality of lugs radially extending from said propeller shaft housing to said propeller housing, said lock system comprising;

an inner fin lock adapted for positioning between said propeller shaft housing and said propeller housing, having a top cover portion and a lower lug gripping edge, an outer fin lock also adapted to position between said propeller shaft housing and said propeller housing, said outer fin lock having a top cover portion and an elongated body portion, said elongated body portion being of sufficient width to nearly completely fill the annular space between two of said lugs, and means to lock said inner and outer fin locks together whereby free rotation of said inner fin lock to a position where it can be removed without its inner gripping edge engaging one of said lugs, is prevented.

2. The propeller lock system of claim 1 wherein said inner fin lock is comprised of an arcuate shaped elongated body member with a cutout adjacent its lower portion to define said lower lug gripping edge.

3. The propeller lock system of claim 1 wherein said elongated body portion of said outer fin lock is arcuately shaped so that it may be concentrically positioned in the annular space between said propeller shaft housing and said propeller housing.

4. The propeller lock system of claim 2 wherein the top cover portion of said inner fin lock and the top cover portion of said outer fin lock are of identical dimensions such that a portion of each may be adjacently and matingly positioned.

5. The device of claim 4 wherein said propeller lock system is made of from about 14 to about 16 guage steel.

6. The device of claim 4 wherein the top cover portions of said inner fin lock and said outer fin lock when adjacently and matingly positioned cover the entire access area, defined by the propeller housing, for access to the interior thereof.

* * * * *